United States Patent [19]

Funahashi et al.

[11] Patent Number: 5,619,425
[45] Date of Patent: Apr. 8, 1997

[54] DATA TRANSMISSION SYSTEM

[75] Inventors: Yasuhiro Funahashi; Kazunori Ikami, both of Nagoya; Yukie Hasegawa, Kasugai, all of Japan

[73] Assignees: Brother Kogyo Kabushiki Kaisha; Xing Inc., both of Nagoya, Japan

[21] Appl. No.: 405,825

[22] Filed: Mar. 17, 1995

[30] Foreign Application Priority Data

Mar. 22, 1994 [JP] Japan .................................. 6-050506

[51] Int. Cl.⁶ ............................................ A63H 1/28
[52] U.S. Cl. ..................................... 364/514 R; 348/7
[58] Field of Search .......................... 364/514 A, 514 R; 348/716, 474, 569, 6, 7, 17; 395/115, 154, 155, 200, 909

[56] References Cited

U.S. PATENT DOCUMENTS 5,382,983  1/1995  Kwoh et al. ............................ 348/716
5,387,942  2/1995  Lemelsou .............................. 348/474

Primary Examiner—Emanuel T. Voeltz
Assistant Examiner—Thomas Peeso
Attorney, Agent, or Firm—Oliff & Berridge

[57] ABSTRACT

The memory device 13 in the center 3 stores a plurality of information data categorized in a plurality of genres. The input device 43 of the terminal 5 selects an information data desired to be obtained, out of the plurality of information data stored in the memory device 13. The control portion 41 in the terminal 5 receives the desired information data and reproduces the desired information, when the desired information data is of a genre the terminal is contracted for. The control portion 41 does not reproduce the desired information or reproduces the desired information in a manner so that the user may not obtain when the desired information data is out of the genre the terminal is contracted for.

24 Claims, 10 Drawing Sheets

| CHANNEL NUMBER | |
|---|---|
| C30 | SONG DATA SONG NUMBER 0-999 |
| C31 | SONG DATA SONG NUMBER 1000-1999 |
| C32 | SONG DATA SONG NUMBER 2000-2999 |
| C33 | SONG DATA SONG NUMBER 3000-3999 |
| C34 | SONG DATA SONG NUMBER 4000-4999 |
| C35 | SONG DATA SONG NUMBER 5000-5999 |
| C36 | UNOCCUPIED |
| C37 | UNOCCUPIED |
| C38 | UNOCCUPIED |

FIG. 6

| GENRE | DETERMINATION FLAG |
|---|---|
| BALLAD SONGS | 1 |
| FOLK SONGS | 0 |
| POP SONGS | 0 |
| ROCK AND ROLL SONGS | 0 |
| OTHER SONGS | 0 |

DATA TRANSMISSION SYSTEM

BACKGROUND OF THE INVENTION

1. Field of the Invention

The present invention relates to a data transmission system wherein a central control unit and a plurality of terminals are connected by a transmission line, the data transmission system being for transmitting information data from the central control unit to the terminals.

2. Description of the Related Art

Conventionally, there is known a data transmission system, wherein a center (central control unit) is connected to a plurality of terminals by a transmission line. The data transmission system is for transmitting information data including various types of information to a terminal from a center according to demands from the terminal side. An advantage of this type of data transmission system is that a memory device for prestoring data information need not be provided to each terminal, so that the terminals have an extremely simple construction.

SUMMARY OF THE INVENTION

This data transmission system can be applied to a karaoke distributing system for distributing karaoke song data to a plurality of terminals, to a movie distributing system for distributing movie data to a plurality of terminals, and to other various information distributing systems such as a cable television system for distributing various information data such as character image data to a plurality of terminals.

For example, typically cable television (CATV) systems are set up so that customers pay a base fee for the privilege to view a predetermined plurality of channels transmitted from a center. Customers can enter an additional contract with an additional fee for the ability to watch special channels outside the base package. Such additional contracts can be in monthly, weekly, or even daily periods and are often for channels that show movies. During the term of the special contract, contracted users can watch as many movies as desired. The terminals of customers not contracted for the special channels are adjusted so their tuners do not operate on the special channels, that is, the special channels are scrambled so that non-contracted customers can not view the special channel.

However, the following problems will occur in this type of data transmission systems. Contracting for the basic package gives customers the right to watch all of the channels and programs included in the base package. However, because each customer has his or her own personal preference for programs, customers develop a pattern for the programs they watch. For example, some viewers may watch sports programs provided in the channels of the base package quite often, but other viewers either rarely or never at all.

The same is also true for customers of karaoke distribution systems. Some customers may want to sing or listen to some genre of karaoke songs quite often, but almost never sing or listen to some other genre. For example, some customers never sing ballads and others never sing rock and roll songs.

Although users may never watch programs outside the range of their personal preference, they must nevertheless pay for the privilege of watching the program when they contract for the basic package. Because payments for the basic package are made in a lump sum, users may feel a sense of financial loss because of paying for programs or karaoke songs in genre they never or almost never use.

It is an objective of the present invention to overcome the above-described problems and provide a data transmission system wherein users can enter contracts for information data by genre so that users can access at a terminal only information data limited to the user's taste.

In order to attain the above objective and other objectives, the present invention provides a data transmission system for transmitting data including image information, sound information, or both, the data transmission system comprising: a central control device having data memory means for storing a plurality of information data categorized in a plurality of genres; a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres; and reproduction control means for controlling the desired information data to be transmitted from the central control device to the terminal and to be normally reproduced at the terminal when the desired image data is of the at least one genre the terminal is contracted for, and for preventing the desired information data from being normally reproduced at the terminal when the desired image data is out of the at least one genre the terminal is contracted for.

According to another aspect, the present invention provides a data transmission system for controlling transmission of information data via a transmission line from a central control unit to a plurality of terminals, the data transmission system comprising: a central control unit including data memory means for storing a plurality of information data categorized in a plurality of genres; and a plurality of terminals connected to the central control unit via a transmission line, each Of the terminals being contracted for at least one genre, wherein the central control unit further includes request polling signal transmission means for transmitting request polling signals to the plurality of terminals for detecting whether the terminal requests transmission of desired information data, wherein each of the plurality of terminals further includes request response signal transmission means for transmitting a request response signal indicating whether or not the terminal requests the transmission of information data when the terminal receives the request polling signal transmitted from the request polling signal transmission means, and wherein the central control unit further includes information data transmission means for transmitting the desired information data to a terminal that has transmitted the request response signal indicating that the terminal requests the transmission of the desired information data, only when the desired information data is of the genre the terminal is contracted for.

According to a further aspect, the present invention provides a data transmission system for controlling transmission of information data via a transmission line from a central control unit to a plurality of terminals, the data transmission system comprising: a central control unit including data memory means for storing a plurality of information data categorized in a plurality of genres; and a plurality of terminals connected to the central control unit via a transmission line, each of the terminals being contracted for at least one genre, wherein the central control unit further includes request polling signal transmission means for transmitting request polling signals to the plurality of terminals for detecting whether the terminal requests transmission of desired information data, wherein each of the plurality of terminals further includes: data selecting means for selecting information data desired to be obtained at the terminal out of the plurality of information data stored in the data memory means of the central control unit; and request response signal transmission means for transmitting a request response signal indicating whether or not the terminal requests the transmission of the desired information data when the terminal receives the request polling signal transmitted from the request polling signal transmission means, the request response signal transmission means transmitting the request polling signal indicating that the terminal requests the transmission of the desired information data only when the desired information data is of the at least one genre the terminal is contracted for, and wherein the central control unit further includes information data transmission means for transmitting the desired information data to a terminal that has transmitted the request response signal indicating that the terminal requests the transmission of the desired information data.

According to another aspect, the present invention provides a data transmission system for transmitting, to each of a plurality of terminals, information which the each terminal desires to receive, the data transmission system comprising: a central control unit including data memory means for storing a plurality of information data units, each indicative of an individual information, the plurality of information data units being categorized in a plurality of genres; and a plurality of terminals connected to the central control unit via a transmission line, each of the terminals including data selecting means for selecting, out of the plurality of information data units, an information data unit indicative of information that the each terminal desires to obtain, each terminal being contracted for at least one genre, wherein the central control unit includes data transmission means for successively transmitting the plurality of data units to each of the plurality of terminals via the transmission line, and wherein each of the plurality of terminals includes reception means for receiving the desired information data unit from the plurality of data units transmitted from the central control unit only when the desired information data unit is of the at least one genre the each terminal is contracted for.

BRIEF DESCRIPTION OF THE DRAWINGS

The above and other objects, features and advantages of the invention will become more apparent from reading the following description of the preferred embodiment taken in connection with the accompanying drawings in which:

FIG. 6 is an explanatory diagram showing one example of a lock out table stored in a terminal;

DETAILED DESCRIPTION OF THE PREFERRED EMBODIMENT

Figure 1:
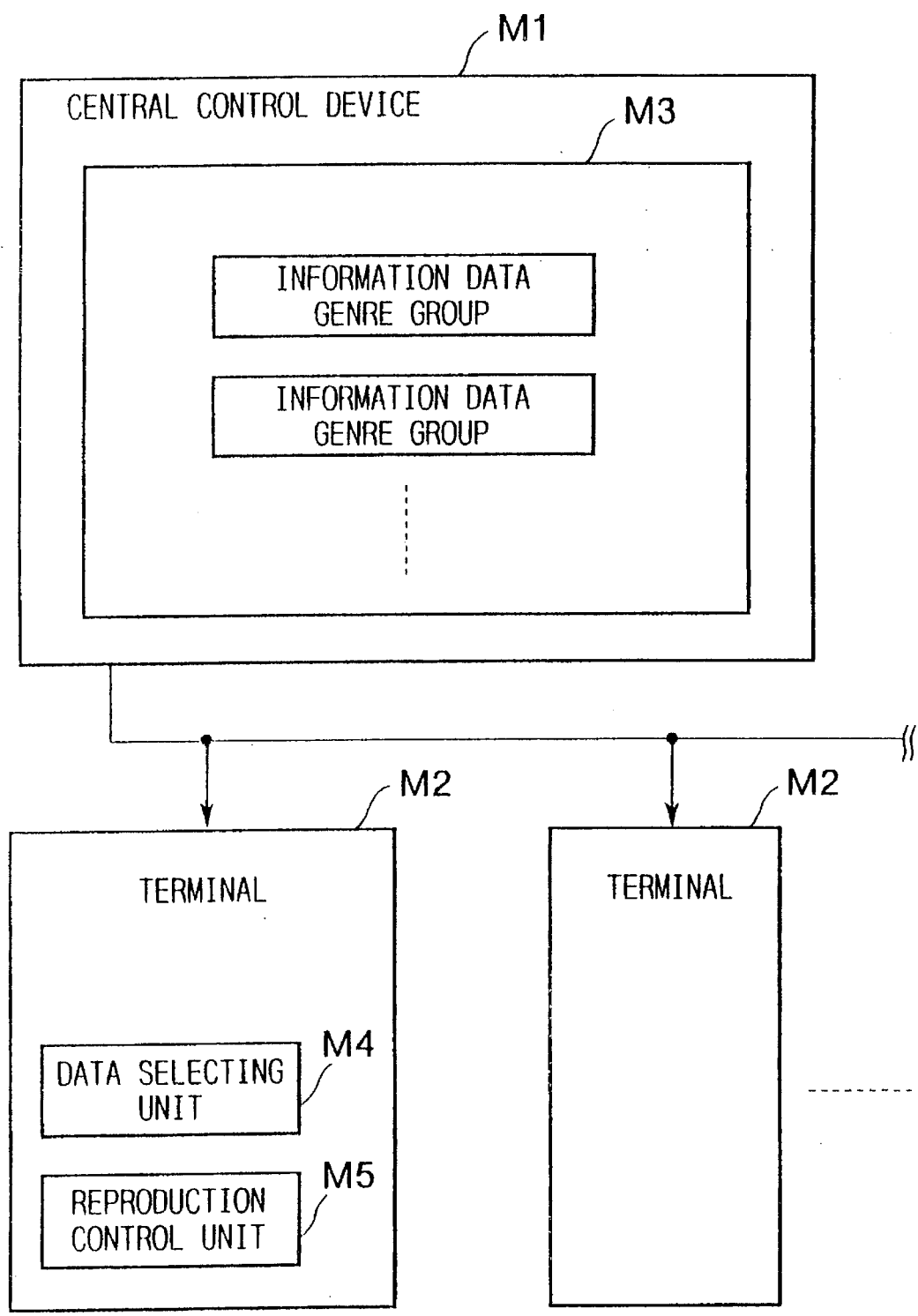
FIG. 1 is a schematic structural diagram showing the basic structure of an embodiment of the present invention.

A data transmission system according to a preferred embodiment of the present invention will be described while referring to the accompanying drawings wherein like parts and components are designated by the same reference numerals as those shown in FIGS. 1 through 10 to avoid duplicating description.

A data transmission system according to the embodiment will be described below with reference to FIG. 1.

As exemplified in FIG. 1, a data transmission system of the embodiment is for transmitting data including image information, sound information, or both from a central control device to a plurality of terminals. In the data transmission system, a central control device M1 has a data memory unit M3 for storing information data in a plurality of information data genre groups categorized by genre. A plurality of terminals M2 are connected to the central control device M1 by transmission lines. Each of the plurality of terminals includes a data selecting unit M4 for selecting desired information data out of the information data by data unit.

Each terminal M2 further includes a reproduction control unit M5 for receiving transmission of the desired information data from the data memory unit M3. The reproduction control unit M5 receives and normally reproduces the desired information data when the desired information data falls into the information data genre group for which user rights are contracted for at the terminal. The reproduction control unit M5 prevents receipt of transmission of or normal reproduction of the desired information data when the desired information data does not fall into the information data genre group for which user rights are contracted for at the terminal.

With this structure, the data memory unit M3 of the central control device M1 stores information data categorized by genre in a plurality of information data genre groups. Using the data selection unit M4 of terminal devices M2, data units of desired information data can be selected from the total pool of information data. When the information data selected by the data selection unit M4 falls into an information data genre group for which user rights are contracted, the reproduction unit M5 receives the selected information data from the data memory unit M3 of the central control device M1 and reproduces it in the normal manner. On the other hand, information data from information data genre groups for which user rights are not contracted is either not reproduced by the reproduction control unit M5 or reproduced in a manner where it cannot be used. For example, information data formed from image data could be scrambled during reproduction so that it cannot be used. Information data formed from sound data could be reproduced so that the resultant sound is repeatedly cut off during reproduction.

Alternatively, the central control device M1 may transmit the desired information data selected by the data selection unit M4 of each terminal M2 from the data memory unit M3 of the central control device M1 to the terminal M2 when the desired information data falls into an information data genre group for which user rights are contracted for at the terminal. The central control device M1 may not transmit the desired information data from the data memory unit M3 to the terminal M2 when the desired information data falls into the information data genre group for which user rights are not contracted for at the terminal.

The data transmission system may be structured in a two way system wherein each terminal further includes a request unit for transmitting requests to the central control device, whereupon the central control device responds to requests by transmitting the desired information data to the terminal. In this type of system, the request unit may not transmit requests to the central control unit for the desired information data that does not fall into the information data genre group for which user rights are contracted for at the terminal.

This data transmission system is a request type data transmission system with dual transmission type configuration. That is, the request unit of each terminal unit M2 transmits requests to the central control device M1. The central control device M1 transmits the desired information data in response to requests. To prevent customers from using non-contracted information data, the request unit of the terminal is designed to not transmit requests to the central control device for the desired information data selected by the data selection unit M4, when the selected information data falls in the non-contracted information data genre group. Because the control device M1 will not transmit information data without receiving a request, the reproduction control unit M5 will not receive any non-contracted information data to reproduce.

Alternatively, the request unit in each terminal M2 may always transmit requests to the central control unit for the desired information data, regardless of whether the desired information data falls into the information data genre group for which user rights are contracted for at the terminal. Upon receiving the request from the terminal M2, the central control device M1 transmits the desired information data to the terminal M2 when the desired information data falls into the information data genre group for which user rights are contracted for at the terminal. The central control device M1 does not transmit the desired information data to the terminal M2 when the desired information data does not fall into the information data genre group for which user rights are contracted for at the terminal.

The data transmission system may be structured in a one way system wherein the central control device constantly transmits a plurality of information data from the data memory unit M3 to the terminals M2. The reproduction control unit M5 in each terminal does not accept from over the transmission line information data that does not fall into the information data genre group for which user rights are contracted for at the terminal.

The above-described data transmission system is a one-way data transmission system. That is, the central control device M1 continuously transmits the plurality of information data from the data memory unit M3 to the terminal units M2. To prevent customers from using non-contracted data, the reproduction control unit M5 is designed to be incapable of receiving information data from the transmission line when the information data selected by the data selection unit M4 falls into the non-contracted information data genre group. Ultimately, the reproduction control unit M5 can not reproduce data information.

According to this embodiment, users can contract for data information by information data genre group, and therefore are able to select the type of data information that best suits his or her tastes. Taking a karaoke distribution system as an example, some users almost never want to sing or listen to certain types of music. According to the present invention, users can be allowed to contract only for those genre they want to sing or listen to. For example, users that only want to sing or listen to ballads will contract only for ballads. Alternatively, users can be allowed to remove from an inclusive contract (base package) those genre they never or almost never want to sing or listen to. For example, users can be allowed to omit ballads or rock and roll songs from the songs in an inclusive contract. Of course, users can contract for use of all songs if they prefer.

Contrary to the system in which user could only contract for all-inclusive use of data information, according to the system of the present invention, users can select only the particular genre in align with their own tastes and contract for only those genre. Users would appreciate a reduction in rates to compensate for those genre of information that the users never or almost never use as allowed by the present invention. Users can access at their terminals only information data that suits their tastes.

By billing customers only according to the number of information data genre groups they contract for, discounts can be given to customers who only use a portion of the total pool of available information data. An overall increase in users can be expected from this financial incentive. Payments can be made either according to the number of songs requested or periodically, for example, monthly, for unlimited use during certain time period.

Next, concrete examples of the embodiment of the data transmission system will be described below with referring to FIGS. 2 through 10. These concrete examples are directed to a karaoke system to which applied is the embodiment of the present invention. In the karaoke system, a plurality of karaoke terminals and a center (central control unit) are connected by a transmission line. According to this karaoke system, when a user requests a song he/she desires to sing at each terminal, karaoke song data of the requested song and background image data appropriate for the requested song transmitted from the center are received and reproduced at the terminal. The terminal plays accompaniment music of the requested song while displaying the lyrics of the song and a background image behind the display of the lyrics.

Next, a first concrete example of the embodiment of the data transmission system will be described below with referring to FIGS. 2 through 6. The first concrete example is a karaoke system of a one way transmission type to which applied is the embodiment of the present invention. In this system, the center continuously transmits karaoke song data of a plurality of karaoke songs to the terminals.

Figure 2:
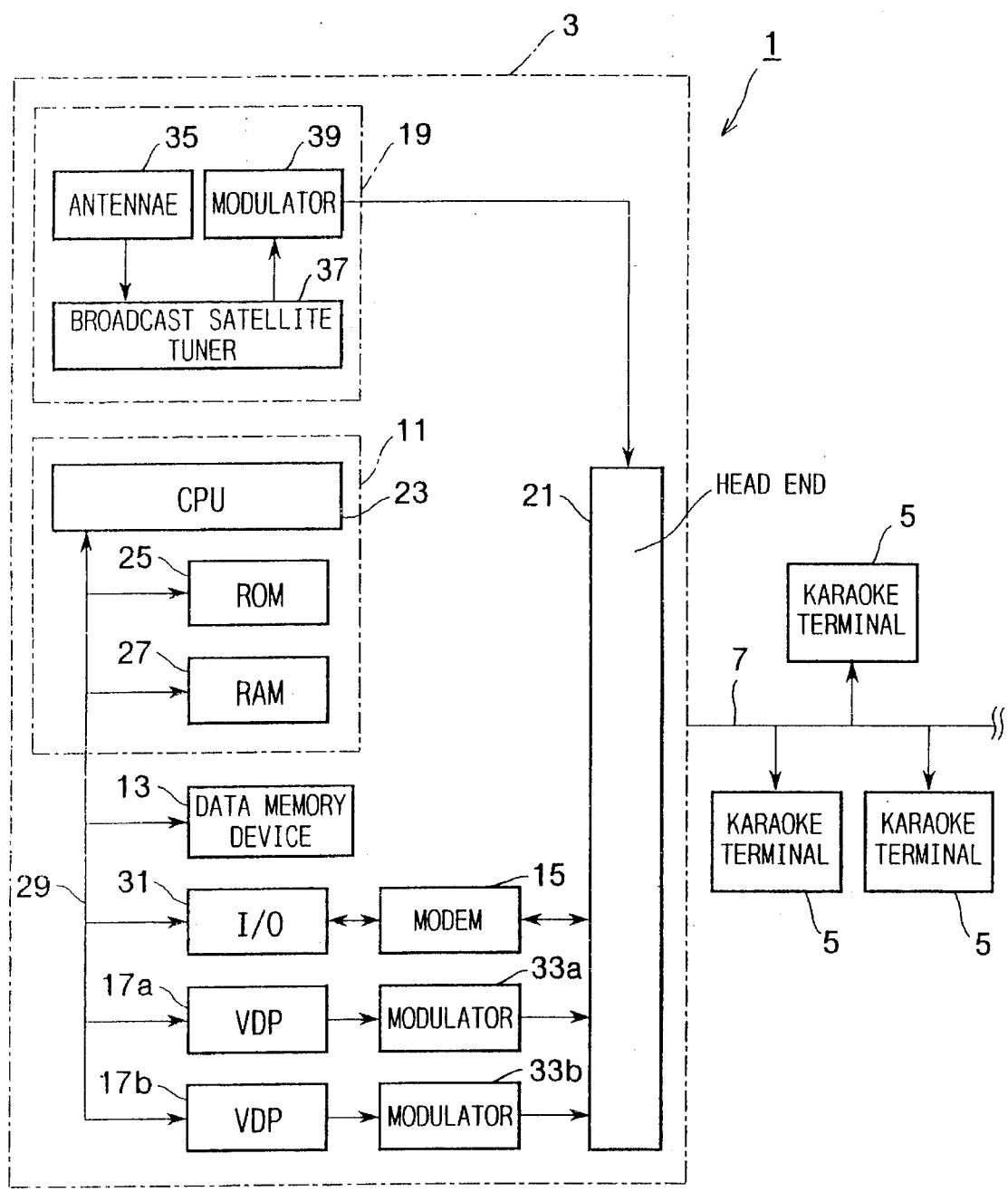
FIG. 2 is a block diagram showing schematic structure of an overall karaoke system and structure of a center according to first and Second concrete examples of the embodiment of the present invention.

As shown in FIG. 2, a karaoke system 1 according to the first concrete example of the embodiment is constructed from a center 3 connected to a plurality of karaoke terminals 5 by coaxial cable 7 (transmission line). The karaoke terminals 5 can be provided in separate buildings or in separate shops or booths within the same building.

Next, an explanation of configuration of the center 3 will be provided while referring to FIG. 2.

The center 3 includes a server (control portion) 11 for performing overall control of the center; a memory device 13 in which karaoke song data are stored; a center modem 15; background image output devices (VDP) 17a and 17b; broadcast satellite reception system 19; a head end 21, etc.

The server 11 includes well-known components such as a central processing unit (CPU) 23, a ROM 25, and a RAM 27. A busline 29 is provided for connecting the server 11 to the memory device 13, an input/output interface (I/O) 31, the background image output devices 17a and 17b, and the like.

A large-capacity memory device, such as a hard disk or a magnetooptic disk, is used in the memory device 13. Several thousand songs worth of karaoke song data are stored in the memory device 13.

Figures 5A, 5B:
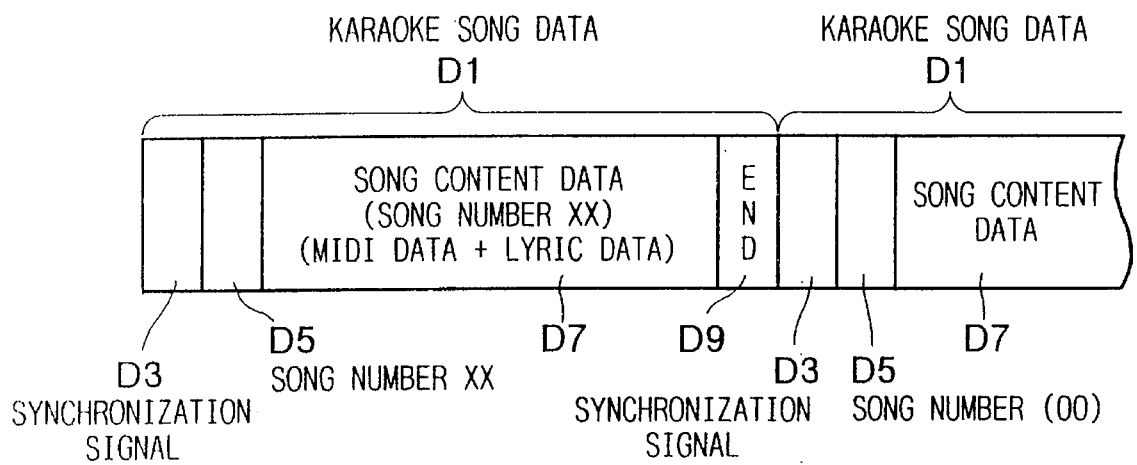
FIG. 5A is an explanatory diagram indicating structure of the karaoke song data of the first and second concrete examples of the embodiment.
FIG. 5B is an explanatory diagram indicating channel structure for transmitting the karaoke song data of the first concrete example of the embodiment.

As shown in FIG. 5A, one song worth of karaoke song data D1 includes a synchronization signal D3; song number data D5 that indicates the song number; song content data D7; and partition data D9 for indicating the end of one song worth of karaoke song data. The song content data D7 includes lyric data, for being projected on a monitor television of the karaoke terminal 5 (to be described later), and instrumental accompaniment data, for being played by a sound source of the karaoke terminal 5 (also to be described later.) It is noted that the accompaniment data is MIDI (Musical Instrument Digital Interface) standard data.

The center modem 15 is for modulating a plurality of karaoke song data retrieved from the memory device 13 to be divided into several different channels, that is, high frequency alternating current signals with different frequency bands. More specifically, all the plurality of karaoke song data retrieved from the memory device 13 are modulated by the center modem 15 to be divided among several channels. A more concrete example will be described while referring to FIG. 5B. In this example, karaoke song data for all requestable songs (6,000 songs, for example) stored in the memory device 13 are modulated to be divided among six different channels C30 through C35 so that, for example, C30 transmits karaoke song data of songs numbered 0 through 999 and C31 transmits karaoke song data of songs numbered 1,000 through 1,999. The karaoke song data that are divided by the channels are serially transmitted over the corresponding channels to each of the karaoke terminals 5 via the head end 21 and the coaxial cable 7. More concretely, the center modem 15 outputs these karaoke song data to the head end 21, which in turn transmits them to all of the plurality of karaoke terminals 5. The method of transmitting the karaoke song data will be explained later.

The background image output devices (video disk players) 17a and 17b are for outputting background image data (video signals according to standard National Television System Committee (NTSC) system) for projecting on the monitor televisions 53 of the karaoke terminals 5 (to be described later). The background image data are categorized according to genre of the requestable karaoke songs. In this example, one output device 17a may store image data representative of images directed toward ballads and folk songs, and the other output device 17b may store image data representative of images directed toward pop songs, rock and roll songs, and other songs. Background image output devices 17a and 17b are connected to individual modulators 33a and 33b. The background image data from the devices 17a and 17b are modulated by the corresponding modulators 33a and 33b into high frequency alternating current signals of different channels and outputted to the head end 21. It is noted that the channels for the background image data are different from the channels C30–C35 over which the karaoke song data are transmitted. For example, each of the devices 17a and 17b always outputs the background image data. Accordingly, the background image data are always transmitted to the terminals 5.

The broadcast satellite reception system 19 includes a reception antennae 35, a broadcast satellite tuner 37, and a modulator 39. The modulator 39 is connected to the head end 21. The tuner 37 outputs broadcast satellite signals including broadcast satellite image signals and broadcast satellite sound signals. The modulator 39 modulates the broadcast satellite signals from the tuner 37 into alternating current signals of a channel (frequency band) which is different from the channels (frequency bands) over which the karaoke song data and the background image data are transmitted. For example, the tuner 37 always outputs the broadcast satellite signals. Accordingly, the broadcast satellite signals are always transmitted to the terminals 5.

The head end 21 includes a variety of devices (not shown) such as a mixer for mixing signals inputted thereto and outputting the mixed signals to the coaxial cable 7. More specifically, the head end 21 has inputted thereto the karaoke song data sent from the center modem 15; the background image signals sent from the modulators 33a and 33b; and the broadcast satellite signals sent from the modulator 39 which have been modulated in the different channels. The head end 21 multiplexes the plurality of different channel signals and outputs them to the coaxial cable 7, along which the multiplexed signals are transmitted to the karaoke terminals 5.

Figure 3:
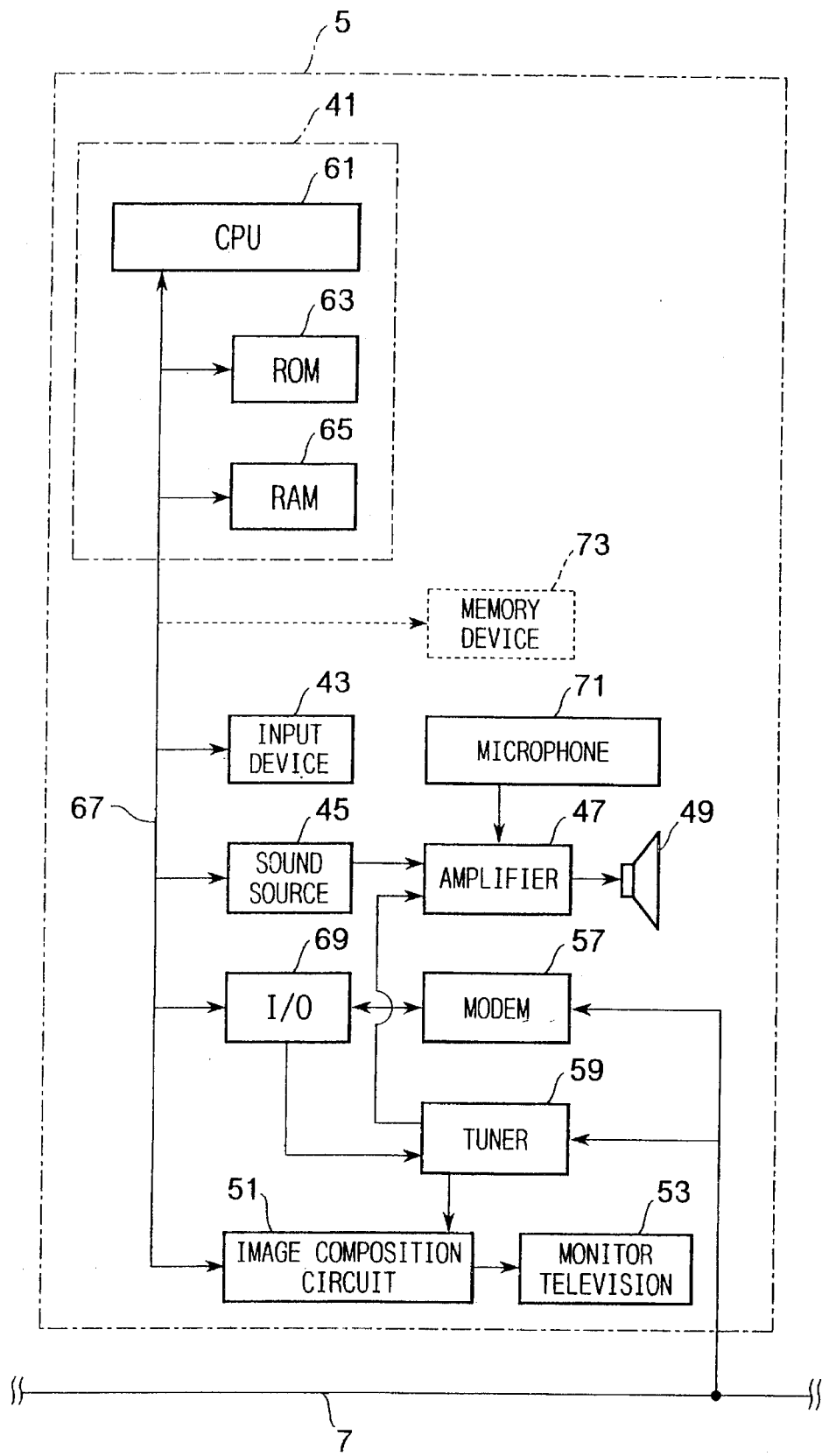
FIG. 3 is a block diagram indicating structure of a karaoke terminal of the first and second concrete examples of the embodiment.

Next, an explanation of the structure of each of the plurality of karaoke terminals 5 will be provided while referring to FIG. 3.

Each karaoke terminal 5 includes a control portion 41 for overall control of the terminal, an input device 43, a sound source 45, an amplifier 47, a speaker 49, an image composition circuit 51, a monitor television 53, a terminal modem 57 for receiving and processing the signals (the plurality of karaoke song data) sent from the center 3, and a video tuner 59 for receiving and processing the signals (the background image data and the broadcast satellite signals) sent from the center 3.

The control portion 41 includes a CPU 61, a ROM 63, and RAM 65, and is connected to the input device 43, the sound source 45, an input/output interface 69, the image composite circuit 51, etc. via a busline 67.

The RAM 65 previously Stores therein a channel information data which indicates a channel over which data of each karaoke song is being transmitted as shown in FIG. 5B. The RAM 65 also previously stores therein a song name/song genre information data indicating a genre of each of a plurality of karaoke songs requestable by each terminal 5. Examples of genre include ballads, folk songs, pop songs, rock and roll songs, and other songs, in this concrete example. The RAM also serves to temporarily store karaoke song data for a karaoke song requested at the input device 43 which has been transmitted from the center 3.

The RAM 65 also stores a lock out table for indicating which genre is locked out at the terminal.

Here, an explanation of what is meant by a locked out genre will be provided. As described already, the songs of the karaoke system 1 are categorized into five different genre including the genre of ballad songs, pop songs, folk songs, rock and roll songs, and other songs. A user can contract for all genre of songs or for individual genre of songs.

The frequency at which genre are used varies with the location of the terminal unit 5. For example, certain genre of songs are more frequently requested than others at the terminals in karaoke establishments with separate rooms for rent by the hour, in clubs and coffee shops that offer karaoke as a service to customers, and in private households with karaoke sets. In each case, some genre are frequently requested and some never or almost never requested. Users can be allowed to contract for only ballads, for example, or alternatively to omit undesired genre such as ballads or rock and roll songs from their contracts.

Songs of non-contracted genre can be locked out by designing the terminal units 5 so they can not be used for genre other than contracted genre. One possible method of locking out non-contracted genre is to store the lock out table in the RAM 65 of each terminal 5. A determination flag is set according to the user's contract to each contracted and non-contracted genre of the five genre, thereby allowing determination of whether or not the genre is locked out.

FIG. 6 shows an example of the lock out table formed in the RAM 65 of one terminal. In this table, a determination flag of 1 is set for the genre for which a user at this terminal is contracted, while a determination flag of 0 is set for the genre for which a user at this terminal is not contracted. In this example, a user at this terminal contracts only for the genre of ballad songs.

The input device 43 includes a variety of key switches by which a user operates the terminal 5. More specifically, the input device 43 includes a number pad (ten key) 43*a* for inputting song numbers of requested songs; mode keys 43*b* for selecting various operation modes; a power source switch 43*c* for turning the power source on and off; and the like. The operation modes of the terminal 5 include a karaoke mode for receiving karaoke song data transmitted from the center 3 and for performing karaoke; and a broadcast satellite mode for receiving a broadcast satellite signal from the center 3 and allowing viewing of the satellite broadcast.

The terminal modem 57 is for receiving and demodulating the karaoke song data transmitted from the center 3 via the coaxial cable 7. The karaoke song data demodulated by the modem 57 are then processed by the control portion 41, and a karaoke song data for the requested song is temporarily stored in the RAM 65. After being temporarily stored in the RAM 65, the karaoke song data for the requested song is again retrieved for karaoke performance processes. The karaoke performance processes will be explained later.

The video tuner 59 is for receiving the satellite broadcast signals, outputted from the broadcast signal system 19 and transmitted from the center 3, and the background image signals, outputted from the background image output devices 17*a* and 17*b* and transmitted from the center 3, and for selecting the channel of the desired image signal. That is, when the karaoke mode is designated as the operation mode using the mode key 43*b* of the input device 43, one of the channels over which the background image signals are transmitted is selected. When the broadcast satellite mode is designated as the operation mode using the mode key 43*b* of the input device 43, the channel over which the broadcast satellite signals are transmitted is selected.

A microphone 71 is provided in each terminal 5 to produce a singing voice signal when a user sings into the microphone.

The sound source (synthesizer sound source) 45 is for converting the MIDI data (accompaniment data), included in the karaoke song data shown in FIG. 5A, into a karaoke accompaniment/sound signal.

The amplifier 47 is for receiving both the karaoke accompaniment/sound signal and the singing voice signal from the microphone 71. The amplifier 47 mixes the accompaniment/sound signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 having the above-described structure will be provided.

First, an explanation of the operation for transmitting the karaoke song data from the center 3 to all of the plurality of terminals 5 will be provided.

The control portion 11 of the center 3 controls the modem 15 to modulate all the karaoke song data stored in the memory device 13 to be divided over the several channels and to transmit the karaoke song data in succession over each channel within a fixed time period (a permissible time period for a user to wait from when the user requests a desired song until when the performance of the song begins) to the karaoke terminals 5 via the coaxial cable 7. This operation is performed regardless of whether or not a song is requested from one of the karaoke terminals 5.

More specifically, the plurality of karaoke song data stored in the memory device 13 are transmitted to the center modem 15 via the input/output interface 31 and modulated to be divided among several channels. The karaoke song data that are thus divided by the several channels are serially transmitted to each of the karaoke terminals 5 via the head end 21 and the coaxial cable 7. When transmission of all songs is completed, transmission from the first song is repeated for every channel. For example, in the channel C30 shown in FIG. 5B, the song data of the song numbers 0 through 999 are successively transmitted. When the transmission of song data of the song number 999 is completed, transmission from song data of the song number 0 is repeated.

Figure 4:
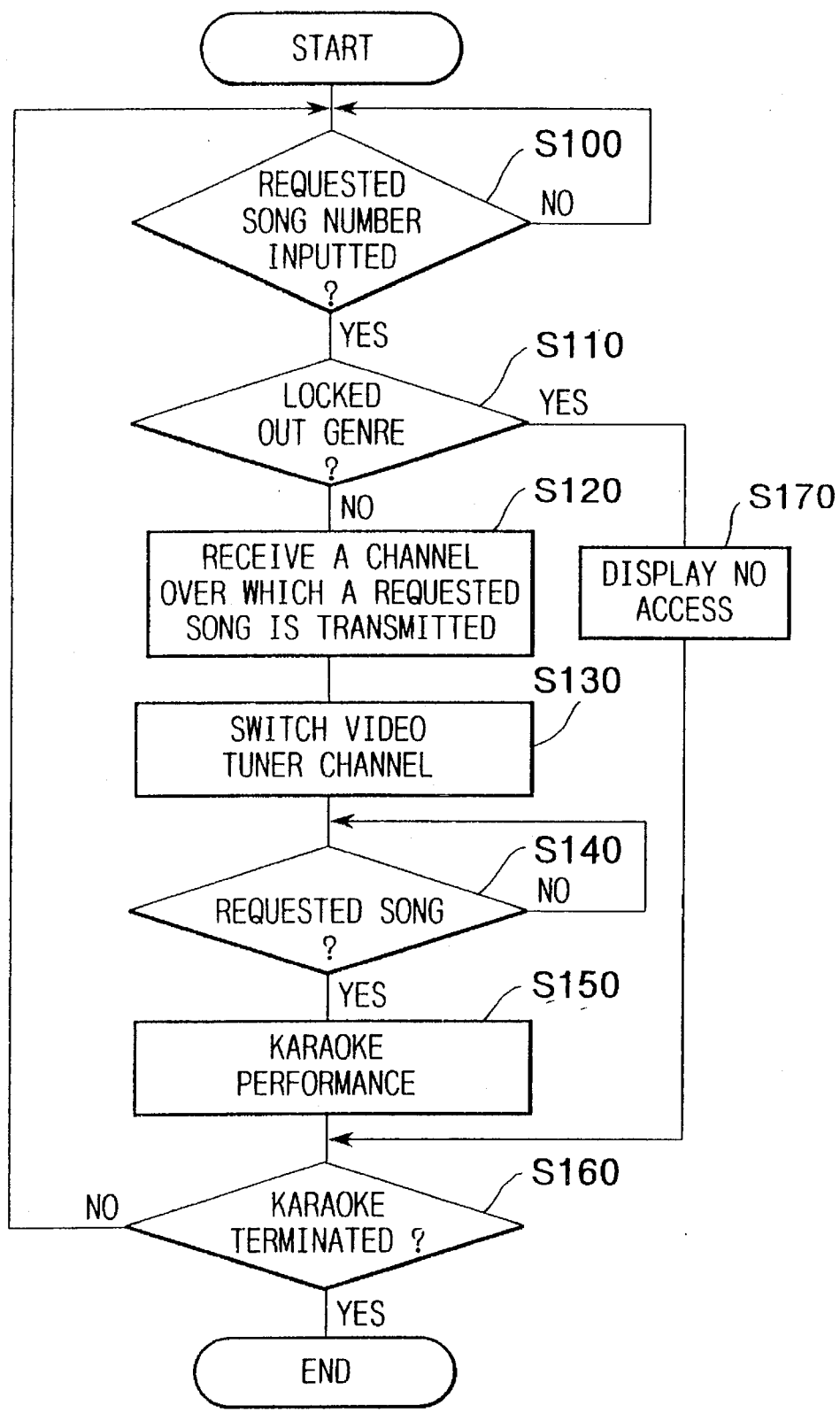
FIG. 4 is a flowchart indicating operations of karaoke terminal of the first concrete example of the embodiment.

Next, an explanation of operations at each of the karaoke terminals 5 for requesting a desired song and reproducing a karaoke song will be provided while referring to the flow chart in FIG. 4.

First, the CPU 61 judges whether a song number of a requested song has been inputted via the input device 43, in step S100. If no request has been made, then the step S100 is repeated. If a song number has been inputted, whether or not the song number of the requested song is one from a locked out genre is determined in S110. This determination in S110 is made by first determining what genre the requested song (which corresponds to the inputted song number) falls under, by referring to the song name/song genre information data. Then, by referring to the lock out table, whether or not the selected song is locked out or not is determined. In the example where the terminal is formed with the table of FIG. 6, when the selected song is of the ballad genre, S110 determines that the selected song is not locked out. When the selected song is out of the ballad genre, S110 determines that the selected song is locked out.

If not locked out (i.e., S110 is NO), that is, when the song belongs to a contracted genre, the CPU 61 refers to the channel information data stored in the RAM 65, and controls the terminal modem 57 to properly receive transmission of the channel over which the requested karaoke song data will be transmitted, in step S120. For example, when a song of the song number 100 (shown in FIG. 5B) is requested, the modem 57 is controlled to receive the channel C30. In the same way, in step S130, the CPU 61 refers to the song name/song genre information data stored in the RAM 65, and switches the video tuner 59 to a channel over which a background image signal corresponding to the genre of the requested song will be transmitted.

Next, in step S140, the CPU 61 refers to the song number data D5, included in each of the plurality of karaoke song data transmitted serially at the channel selected in step S120, and judges whether the transmitted karaoke song data represents the user's requested song. If not for the desired song, step S140 is repeated. However, if the data is for the requested song, the corresponding karaoke song data is temporarily stored in the RAM 65. Afterward, karaoke performance processes are performed in step S150.

In the step S150, the CPU 61 retrieves the karaoke song data stored temporarily in the RAM 65. The CPU 61 inputs the lyric data included in the karaoke song data into the image composition circuit 51 where the lyric data is converted into a lyric/image signal. The CPU 61 also inputs the background image signal transmitted over the channel selected by the video tuner 59 into the image composition circuit 51. The background image and the lyric/image signal are superimposed by the image composition circuit 51, whereupon the characters of the lyrics are displayed on the monitor television 53 superimposed on the background image.

On the other hand, the MIDI data included in the retrieved karaoke song data is converted into an accompaniment signal by the sound source 45 and inputted to the amplifier 47. The accompaniment signal is mixed with the voice signal from the microphone 71 as sung by a user, amplified appropriately, and outputted to the speaker 49.

When the above-described karaoke performance process of step S150 is completed, the CPU 61 judges whether to continue the karaoke song performance in step S160. If the performance is to be continued, the program returns to step S100 whereupon steps S100 through S150 are repeated. If the karaoke song performances are to be terminated, this program is temporarily completed.

On the other hand, when the requested song belongs to a non-contracted genre (i.e., S110 is YES), a display indicating that the requested song can not be accessed because it is not among those contracted for is shown in S170 and the program proceeds to S160, whereupon a user can decide whether to input a song number of another requested song via the input device 43.

In this way, in the karaoke system according to the first example, the center serially transmits the plurality of karaoke song data, in the form of a plurality of song data units, including information such as lyrics and accompaniment music to the karaoke terminals 5 via the transmission line 7. In each of the karaoke terminals 5, one karaoke song data unit for the requested song is selected from the serially transmitted plural karaoke song data, and is reproduced. The accompaniment and lyrics included in the selected karaoke song data unit are then outputted to the speaker 49 and the monitor television 53, respectively. When a requested song does not belong to a contracted genre, the karaoke data will not be reproduced because its reception is impossible.

The above-described first example is directed to a one way system in which the central control device 3 constantly supplies information data. Reproduction of karaoke data from locked out genre (i.e., S110 is YES), that is, from genre which are not contracted for, can be prevented by preventing its reception by the terminal unit 5. However, reproduction of data in locked out genre can be prevented in a request type karaoke distribution system, wherein karaoke data is sent from the central control device in response to requests from a terminal unit, by designing the terminal units to be incapable of sending requests for songs in non-contracted genre. Similarly to the above first example, whether or not the requested song is of a contracted genre is determined by referring to the lock out table stored in the RAM 65.

A second concrete example of the embodiment will be described below with reference to FIGS. 2, 3, 5A, 6, 7-9. The first concrete example is directed to the one way system, in which karaoke data for all the karaoke songs are transmitted successively via several channels as shown in FIG. 5B. Contrarily, the second example is directed to a two way type karaoke system, in which karaoke data for a requested karaoke song is transmitted from the center to a terminal upon requested by the terminal.

In this two way type karaoke system, the center 3 transmits mode polling signals to all the terminals 5 for confirming an operation mode of each terminal 5. Each terminal transmits to the center 3 mode response signals, in response to mode sense polling signals. The mode response signal is a signal by which each terminal responds to the center 3 about its own operation mode. The center 3 further transmits request polling signals only to the terminals 5 determined to be in a karaoke mode, for confirming whether a request for transmission of karaoke song data is present at each terminal that is in the karaoke mode. Upon receiving the request polling signal, a terminal transmits a request response signal to the center. The request response signal is a signal for responding to the center 3 about whether there is a request for a song (that is, a request for transmission of karaoke song data) in response to the request polling signal.

In the center 3 of this second example, the server 11 shown in FIG. 2 performs to produce a mode sense polling signal and a request polling signal. The center modem 15 performs to modulate not only karaoke song data retrieved from the memory device 13 but also mode sense polling signals and request polling signals outputted from the server 11 into alternating current signals of a predetermined same channel (that is, a predetermined same frequency band), and then outputting the alternating current signals to the head end 21. It is noted that the channel is different from channels into which the background image signals from the modulators 33a and 33b and broadcast satellite signals from the modulator 39 are modulated. Modulated signals of karaoke song data, of mode sense polling signals, of request polling signals, of background image signals, and of broadcast satellite signals are inputted to the head 21. The head end 21 multiplexes the plurality of different channel signals, and outputs them to the coaxial cable 7, along which the multiplexed signals are transmitted to the terminals 5.

In this second example, the RAM 27 further stores a mode management table for indicating a present operation mode of each of the plurality of terminals 5.

In each terminal 5, the RAM 65 shown in FIG. 3 is further formed with an operation mode table for storing the present operation mode of the terminal 5. The RAM 65 is also formed with a song number maintenance memory for storing the song number of a karaoke song requested by the input device The control portion 41 performs to produce a mode response signal and a request response signal. More specifically, the control portion 41 produces the mode response signal, referring to the operation mode table formed in the RAM 65. The mode response signal is added with data indicating the present operation mode of the corresponding terminal. The control portion 41 produces the request response signal, referring to the song number maintenance memory formed in the RAM 65. If a request has been made, the song number data of the requested karaoke song stored in the song number maintenance memory is attached to the request response signal.

The terminal modem 57 performs to receive and demodulate the karaoke song data, the mode sense polling signals, and the request polling signals that are transmitted from the center 3 via the coaxial cable 7. The terminal modem 57 also performs to modulate signals, such as mode response signals and request response signals outputted from the control portion 41, and transmits them to the center 3. Processes for transmitting these signals will be described later.

Except the above-described points, the structure of the data transmission system of this example is the same as that of the data transmission system of the first example shown in FIGS. 2, 3, 5A and 6.

Next, an explanation of operation of the karaoke system 1 according to the second example having the above-described structure will be provided.

First, an explanation of the operation of the center 3 will be provided.

Figure 7:
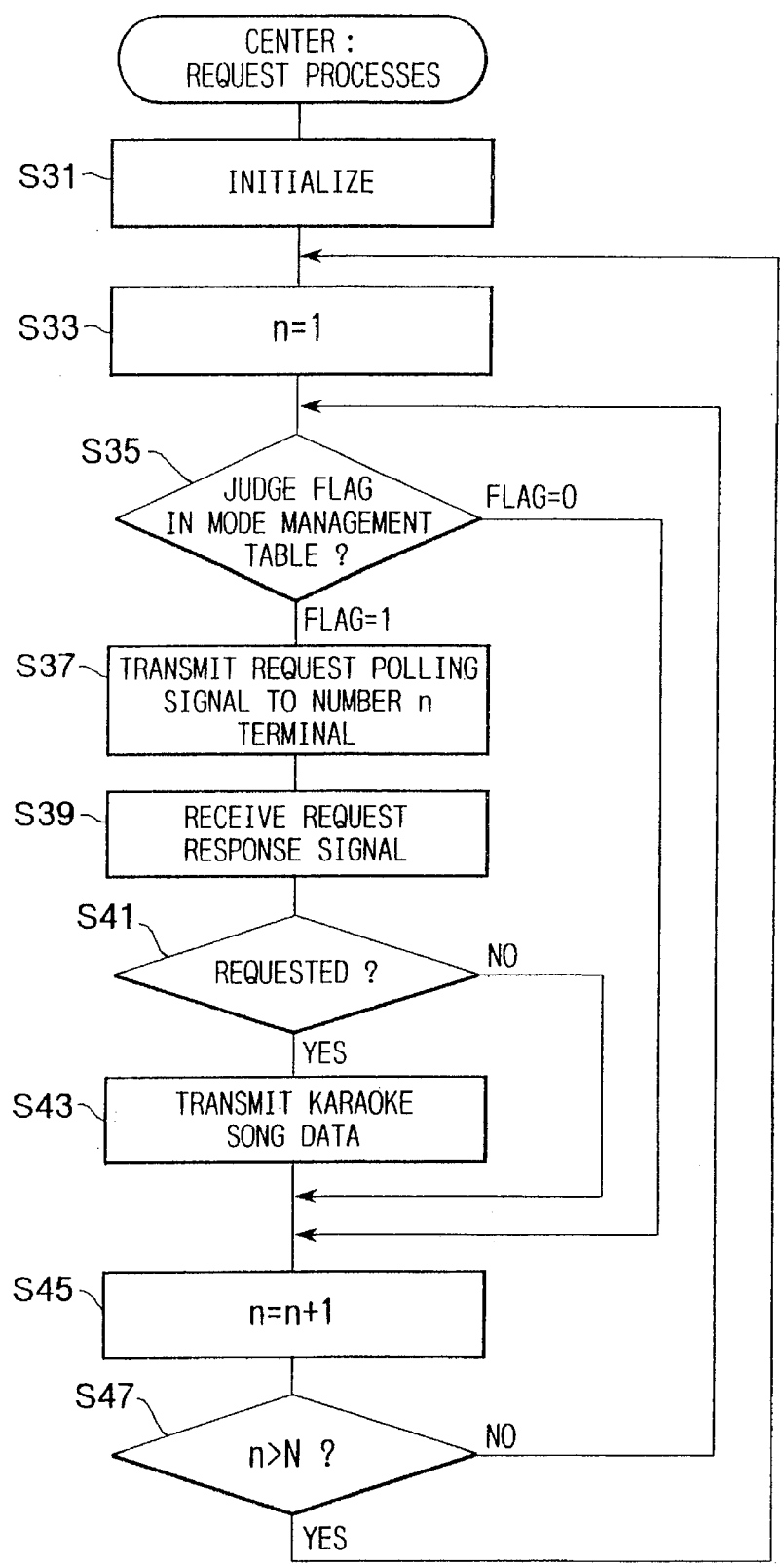
FIG. 7 is a flowchart indicating request operations of center of the second concrete example of the embodiment.

The server 11 in the center 3 executes mode sense processes and center request processes shown in FIG. 7. The mode sense processes are for transmitting mode sense polling signals to all of the plurality of terminals 5 so as to detect the respective operation modes of all the terminals. The center request processes are for transmitting request polling signals only to the terminals 5 that are determined by the mode sense processes to be in the karaoke mode so as to detect whether the terminals in the karaoke mode request transmission of karaoke songs.

The center request processes of FIG. 7 are continually executed. Request polling signals, for interrogating whether or not a song request is present, are transmitted only to terminals 5 that are determined to be in karaoke mode by the mode sense processes. The mode sense processes are repeatedly executed every predetermined time period (for example, every 30 seconds) by a timer interrupt of the center request processes. That is, the center request processes are interrupted every predetermined time period, and the mode sense processes are executed.

The mode sense processes will be described below. In the mode sense processes, mode sense polling signals are transmitted in succession to all of the karaoke terminals 5 connected to the center 3. Each terminal 5 transmits a mode response signal in response to these mode sense polling signals. The center 3 determines whether or not each terminal 5 is in the karaoke mode based on the mode response signals, and the result of the determination is stored in the mode management table of the RAM 27. That is, when a terminal is determined as being in karaoke mode, the mode flag for the terminal in the mode management table is set to one (1). When a terminal is determined as being in a mode other than the karaoke mode, the flag is set to zero (0).

The request processes will now be described below with reference to FIG. 7.

When the center 3 is turned ON, the CPU 23 starts conducting the request processes. The CPU 23 continues executing the request processes, until the center 3 is turned OFF.

In the request processes, the CPU 23 first performs initialization to clear the RAM 27 and the like, in step S31. Then, in step S33, the CPU 23 sets the terminal number n to one (1).

The CPU 23 refers the flag for the number n terminal 5 in the mode management table of the RAM 27 in step S35. When the flag is determined as one (1), it is determined that the number n terminal is in the karaoke mode. Accordingly, the CPU 23 produces a request polling signal added with an address code indicating the terminal number n. The modem 15 modulates the request polling signal and outputs it toward all the terminals 5, in step S37. Upon receiving the request polling signal, each of the karaoke terminals 5 refers to the address code attached to the request polling signal to determine whether this request polling signal is for itself. Accordingly, the number n terminal 5 determines that the request polling signal added with the address code of the corresponding terminal number n is for itself.

Then, in step S39, a request response signal is transmitted from the number n terminal 5 to the center 3, in response to the request polling signal. The request response signal transmitted from the number n terminal indicates whether there is a request for a karaoke song at the number n terminal. When a request has been made at the number n terminal, the request response signal is added with the song number data and the like of the requested song. Accordingly, in step S41, the CPU 23 processes the request response signal to judge whether there is a song request at the number n terminal. If it is determined that a request has been made at the number n terminal, in step S43, the CPU 23 retrieves the karaoke song data for the requested song from the memory device 13, based on the song number data and the like included in the request response signal. The CPU 23 then transmits the karaoke song data to the number n terminal 5.

It is noted that in this step S43, the karaoke song data in the form as shown in FIG. 5A retrieved from the memory device 13 is added with an address code indicating the terminal number n, similarly to the request polling signal. The modem 15 modulates the karaoke song data and outputs it toward all the terminals 5. Upon receiving the karaoke song data, each of the karaoke terminals 5 refers to the address code attached thereto to determine whether this karaoke song data is for itself. Accordingly, the number n terminal 5 determines that the karaoke song data added with the address code of the corresponding terminal number n is transmitted for itself.

The program then proceeds to the next step S45. If it is determined in the step S41 that there has been made no request in the number n terminal, the program proceeds directly to the step S45.

Similarly, if the flag for the number n terminal in the mode management table of RAM 27 is determined to be zero (0) in the step S35, because it is determined that the number n terminal is not in the karaoke mode, the program proceeds directly to the step S45 without executing the above steps S37 through S43. That is, the request polling signals are not transmitted to the terminals not in the karaoke mode.

Then, in the step S45, the terminal number n is incremented by one (1) (n=n+1). The program then proceeds to step S47 to judge whether the terminal number n is greater than the maximum terminal number N (=total number of the terminals 5 connected to the center 3). If determined as not greater, the program returns again to step S35 and the processes in steps S35 through S45 are repeated on the number n+1 terminal. On the other hand, if n is determined as being greater than N in step S47, the program returns to step S33 where the terminal number n is set to one (1) and the processes in steps S35 through S45 are again performed from the number one terminal 5.

In this way, by referring to the flag in the mode management table in the request processes, request polling signals are transmitted only to terminals 5 that are in the karaoke mode.

Next, operations in each terminal 5 will be explained. Each terminal 5 executes key input processes indicated by the flowchart in FIG. 8 and transmission interrupt processes shown in FIG. 9.

Figure 8:
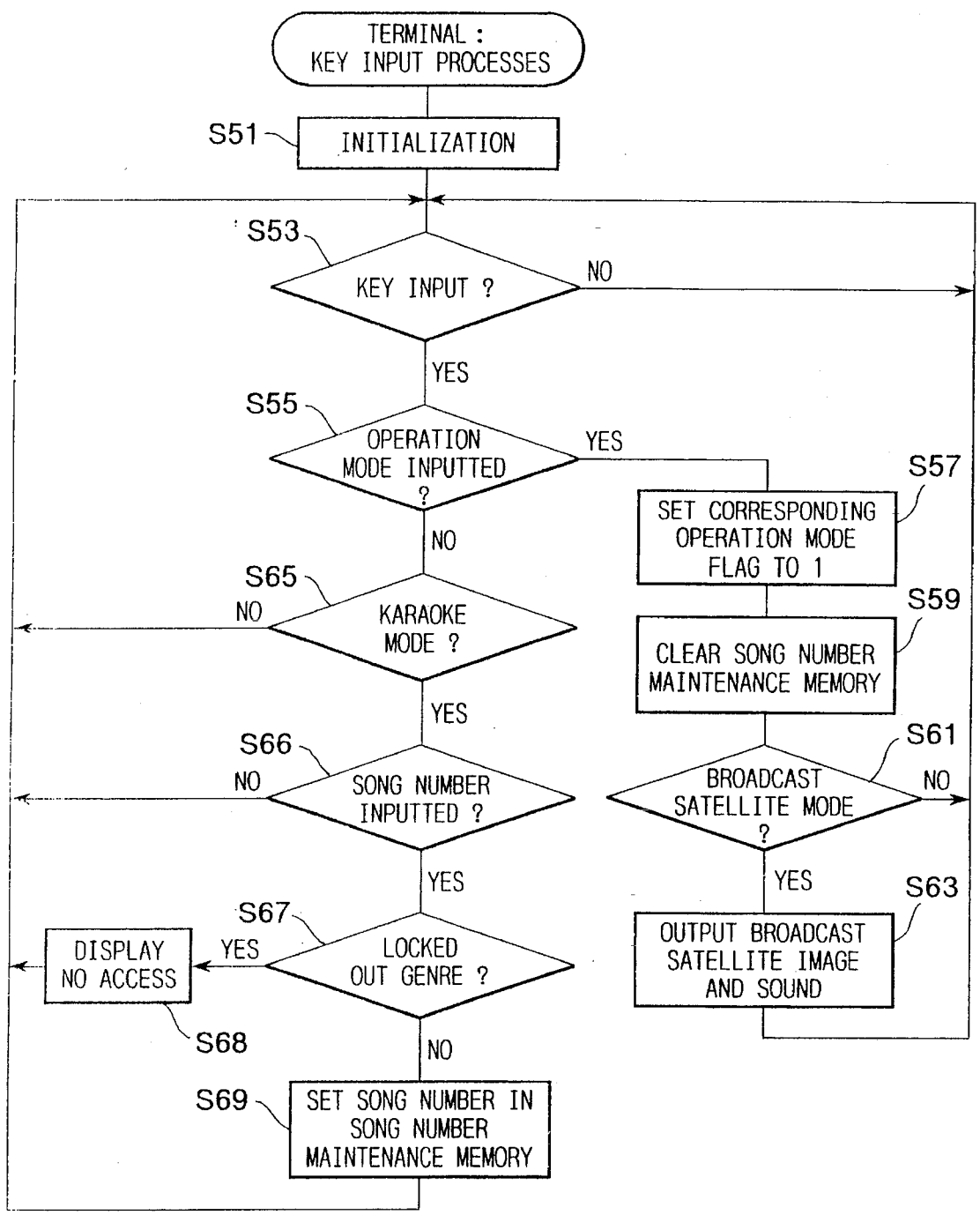
FIG. 8 is a flowchart indicating key input operations of karaoke terminal of the second concrete example of the embodiment.
Figure 9:
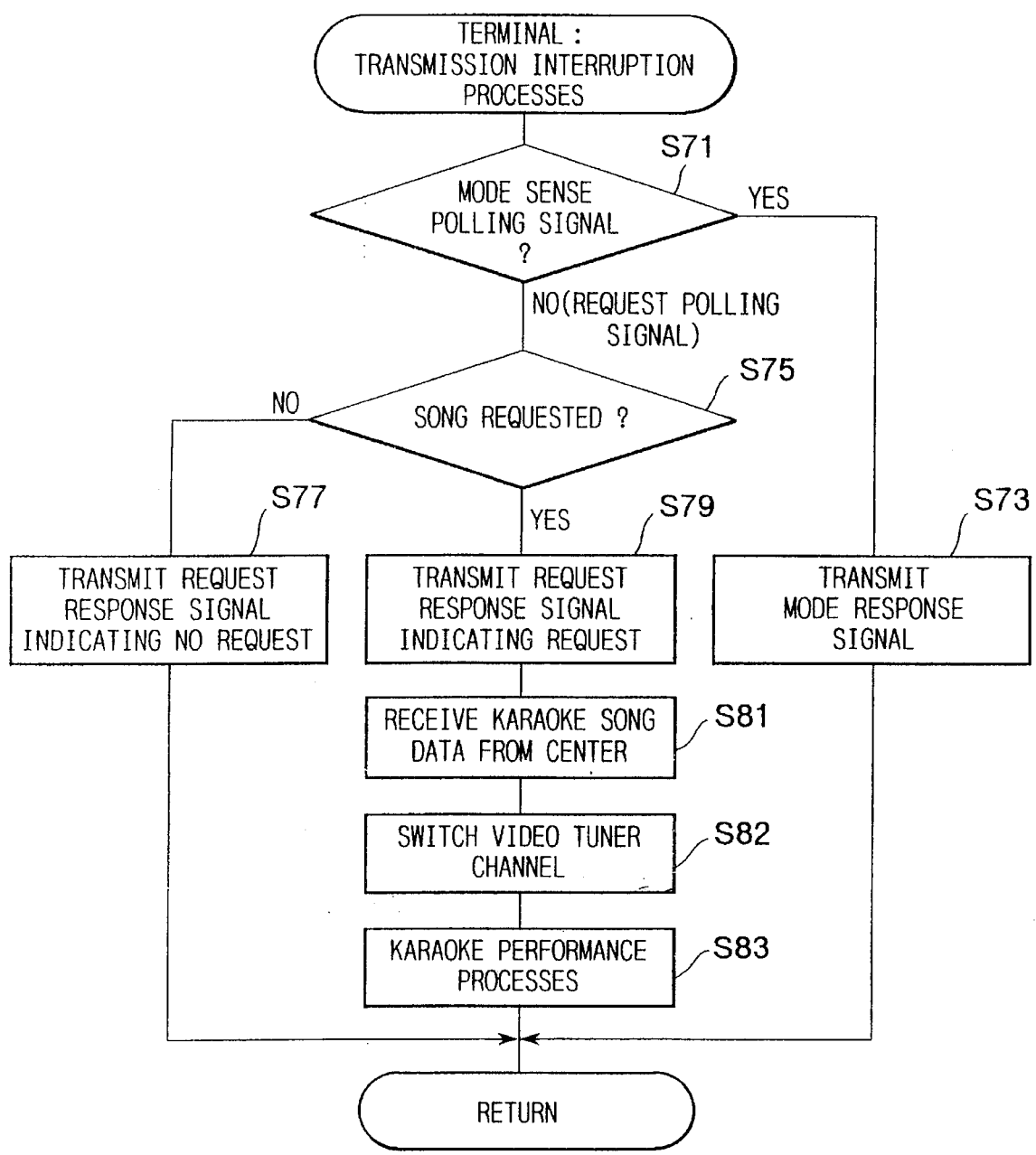
FIG. 9 is a flowchart indicating transmission interruption operations of karaoke terminal of the second concrete example of the embodiment.

The key input processes of FIG. 8 are continually executed for detecting input from the keys of the input device 43 so as to receive the operation mode set to the terminal 5, input of the song number of a requested song, and the like. When mode sense polling signals or request polling signals are transmitted from the center 3, the key input processes are interrupted, and the transmission interruption processes of FIG. 9 are executed. The transmission interruption processes perform processes for transmitting a mode response signals, that indicate the present operation mode of the terminal, to the center 3 in response to the mode sense polling signal and for transmitting a request response signal, that responds as to whether a song has been requested at the terminal, in response to the request polling signal. When the karaoke song data is transmitted from the center 3 to the terminal, the transmission interruption processes also process the karaoke song data so that karaoke can be performed.

Here, a detailed explanation of the key input processes of FIG. 8 will be provided.

When the power source switch 43c is turned ON, the CPU 61 starts conducting the key input processes. The CPU 61 continues executing the key input processes, until the power source switch 43c is turned OFF.

In the key input processes, the CPU 61 in the control portion 41 first performs initialization to clear the RAM 65, in step S51. Then, the CPU 61 judges whether there has been some sort of key input from the input device 43 (that is, the key pad 43a, one of the mode keys 43b, and the like), in step S53. If no key input has been made, the program returns to step S53 and waits for key input.

On the other hand, when key input is determined as present in the step S53, the CPU 61 judges whether the input is for setting the operation mode by manipulation of the mode key 43b, in step S55. If the input is input of the operation mode, in step S57, the CPU 61 sets, to one (1), a flag for the corresponding operation mode in the operation mode table of the RAM 65. For example, if the key input sets the operation mode of the terminal into the karaoke mode, the flag for karaoke mode in the table is set to one (1).

Then, in step S59, the CPU 61 clears the song number maintenance memory in the RAM 65. In step S61, the CPU further judges whether the present mode is the broadcast satellite mode, by referring to the flag of the operation mode table. Here, if the present mode is the broadcast satellite mode, the CPU 61 controls the video tuner 59 so as to select the broadcast satellite channel. As a result, the broadcast satellite image and the broadcast satellite sound are outputted to the monitor television 53 and the speaker 49 is step S63.

On the other hand, if the mode is determined not to be the broadcast mode in the step S61, the program again returns to the step S53.

On the other hand, if the input is determined not from the mode key 43b in S55, the CPU judges whether the present operation mode is the karaoke mode, in step S65, by referring to the operation mode table. If not, the program again returns to the step S53. If the present mode is the karaoke mode, the CPU judges whether the key input is a song number input of a requested song by the number pad 43a in step S66. If not, the program returns to the step S53. However, if the input is the song number input, the CPU judges whether the requested song is locked out or not, referring to the song name/song genre table and the lock out table, in S67, in the same manner as in S110 of FIG. 4. When the requested song belongs to a non-contracted genre (S67, Yes), a display indicating that the requested song can not be accessed because it is not among those contracted for is shown in S68 and the program proceeds to S53, whereupon a user can decide whether to input a song number of another requested song via the input device 43.

On the other hand, if the song belongs to a contracted genre (No in S67), the song number data is set in the above-described song number maintenance memory in the RAM 65, in step S69, whereupon the program returns to the step S53.

Next, a detailed explanation on the transmission interruption processes of FIG. 9 will be provided.

When the terminal 5 receives a mode sense polling signal or a request polling signal from the center 3, the CPU 61 interrupts the key input processes of FIG. 8 and executes the transmission interruption processes.

In the transmission interruption processes, the CPU 61 first judges whether the polling signal inputted from the center 3 is a mode sense polling signal or not in step S71. If determined as a mode sense polling signal, the CPU 61 produces a mode response signal, referring to the flag presently set in the operation mode table in the RAM 65. It is noted that the mode response signal has data added thereto that indicates the present operation mode of the terminal. The CPU then transmits the mode response signal via the modem 57 to the center 3, in step S73.

On the other hand, if it is determined that the polling signal is not a mode polling signal and therefore is a request polling signal in step S71, the CPU judges whether there is a song request or not in step S75, by referring to the song number maintenance memory in the RAM 65. If no song number is set in the song number maintenance memory and therefore no request is determined, the CPU 61 produces a request response signal indicating no request. Then, the CPU transmits the request response signal via the modem 57 to the center 3 in step S77. Then, the program returns to the key input processes of FIG. 8.

On the other hand, if any song number is set in the song number maintenance memory and therefore a request is determined in the step S75, the CPU produces a request response signal requesting transmission of karaoke song data of the requested song. Song number data and the like of the requested song set in the song number maintenance memory are attached to this request response signal. The CPU transmits the request response signal via the modem 57 to the center 3 in step S79. It is noted that because any songs of the non-contracted genre are not set in the song number maintenance memory in the key input process, the terminal never requests transmission of any non-contracted song. The terminal requests to the center 3 transmission of only its contracted song.

Then, the terminal receives karaoke song data for the requested song transmitted from the center 3 in response to the request response signal, in S81. The CPU 61 temporarily stores the karaoke song data in the RAM 65.

Afterward, the video tuber 59 is switched to the channel proper to the requested song genre, and the karaoke performance processes the same as the step S150 in the first example are performed in step S83.

When the above-described karaoke performance processes of step S83 are completed, the program returns to key input processes of FIG. 8.

Thus, according to this second example, the terminal never requests transmission of non-contracted genre songs to the center 3, and therefore never receives to reproduce the non-contracted genre songs.

Figure 10:
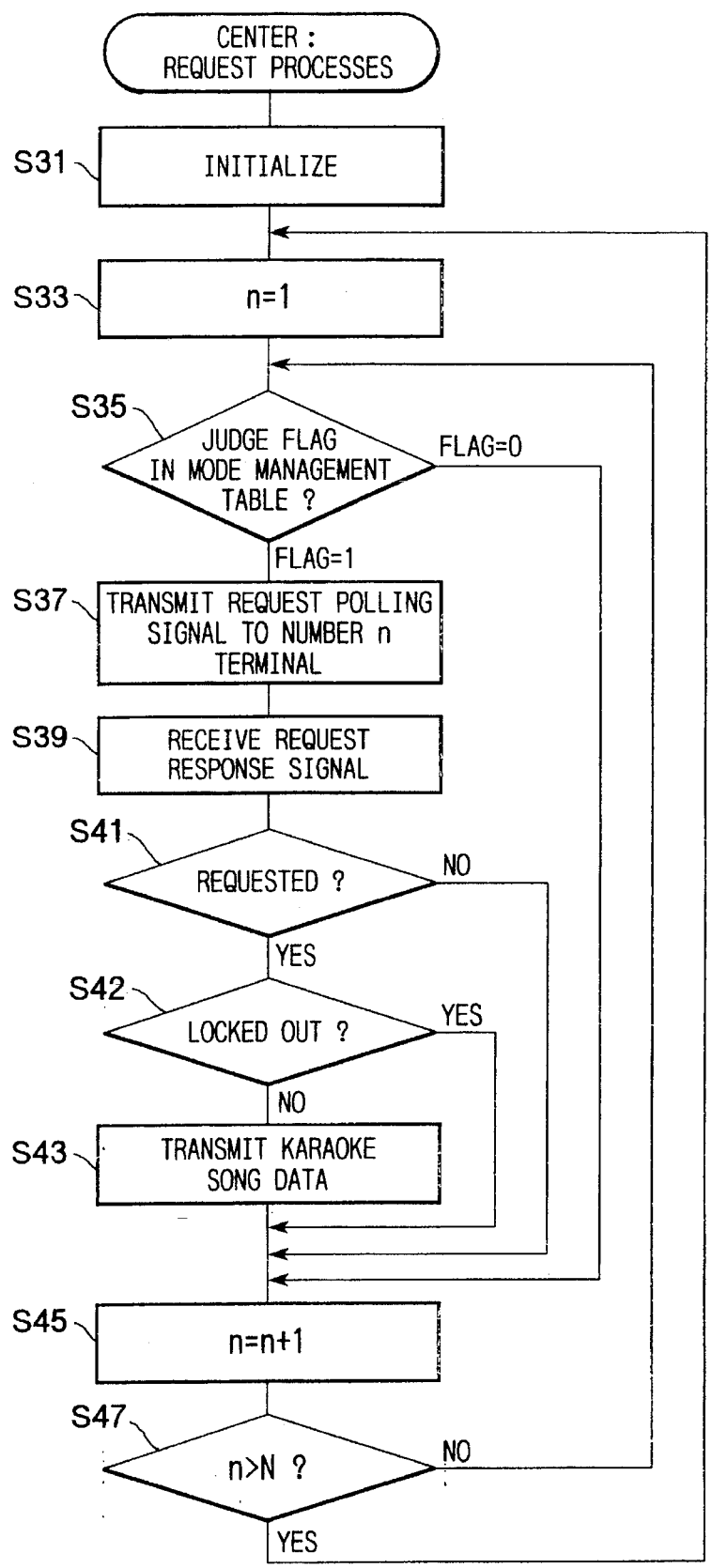
FIG. 10 is a flowchart indicating request operations of center of a modification of the second concrete example of the embodiment.

A modification of the above-described second example will be described below with reference to FIG. 10.

In the second example, the terminal judges whether the requested song is of a contracted genre, referring to the lock out table, and then requests transmission of the requested song data only when the requested song is of the contracted genre. However, the terminal may not perform such a judgement. The terminal may always request transmission of the requested song data, regardless of whether the requested song is of the contracted genre or not. In other words, the steps S67 and S68 may be omitted from the key input processes of FIG. 8, but all the requested songs may be recorded in the song number maintenance memory, regardless of whether the requested song is of the contracted genre or not.

In this modification, the RAM 65 of each terminal 5 need not be formed with the lock out table. However, the RAM 27 of the center 3 should be formed with a plurality of lock out tables for the respective terminals. FIG. 10 shows center request processes which the center performs in place of the processes of FIG. 7, in this modification. The processes of FIG. 10 are the same as those of FIG. 7 except that the processes of FIG. 10 include S42. As shown in FIG. 10, when receiving request response signals from one terminal in S39 and if the request response signal indicates that the terminal has requested a song (Yes in S41), the center refers to the lock out table for this terminal to determine whether the song requested by the request response signal is of a genre contracted at the terminal, in S42. When the requested song is of the contracted genre (No in S42), the center transmits the karaoke song data of the requested song to the terminal, in S43. On the other hand, when the requested song is not of the contracted genre (Yes in S42), the center does not transmit the data to the terminal. Thus, the terminal never receives the non-contracted song data.

In the above-described examples, the terminal never receives the non-contracted song data. Alternatively, the non-contracted data can be received and reproduced at the terminal, but reproduced in a manner so that sound is cut off repeatedly during the performance so that the music cannot be used. Another way to prevent use of karaoke data in non-contracted genre is to reproduce the data but not display the lyrics of the song on the karaoke screen. In this way, the user will be unable to sing the song.

As described above, according to the present embodiment, the memory device 13 in the center 3 stores a plurality of information data categorized in a plurality of genres. The input device 43 of the terminal 5 selects an information data desired to be obtained, out of the plurality of information data stored in the memory device 13. The control portion 41 in the terminal 5 receives the desired information data and reproduces the desired information, when the desired information data is of a genre the terminal is contracted for. The control portion 41 does not reproduce the desired information or reproduces the desired information in a manner so that the user may not obtain when the desired information data is out of the genre the terminal is contracted for.

While the invention has been described in detail with reference to specific embodiment thereof, it would be apparent to those skilled in the art that various changes and modifications may be made therein without departing from the spirit of the invention, the scope of which is defined by the attached claims.

In the above-described second example, the center achieves the mode sense process to transmit to all the terminals mode sense polling signals to confirm the operation modes of the respective terminals. The center performs the request process to transmit request polling signals to the terminals that are determined as being in the karaoke mode by the mode sense processes. However, the center need not necessarily achieve the mode sense processes. The center may transmit request polling signals to all the terminals, regardless of operation modes of the terminals.

For advertising purposes and to increase users interest in genre they normally do not use, special service times could be established when songs of non-contracted genre are unlocked.

The present invention can be applied to other information data distribution systems besides karaoke systems. For example, the present invention could be applied to CATV program distribution systems or systems for distributing weather or traffic information. The programs of a CATV system could be divided into different genre by content. Weather and traffic information could be divided by locality. For example, most users do not need to hear weather reports for the entire country, bug may only need to hear weather reports for certain localities where they intent to travel for business or pleasure.

What is claimed is:

1. A data transmission system for transmitting data including image information, sound information, or both, the data transmission system comprising:

a central control device having data memory means for storing a plurality of information data categorized in a plurality of genres;

a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres each of the plurality of terminals including data storage means for temporarily storing the desired information data transmitted from the central control device; and reproduction control means for controlling the desired information data to be transmitted from the central control device to the terminal to be stored in the data storage means and to be normally reproduced at the terminal when the desired image data is of the at least one genre the terminal is contracted for, and for preventing the desired information data from being normally reproduced at the terminal when the desired image data is out of the at least one genre the terminal is contracted for.

2. A data transmission system of claim 1, wherein the reproduction control means prevents the terminal from reproducing the desired information data which is transmitted from the central control device and stored in the data storage means when the desired information data is out of the at least one genre the terminal is contracted for.

3. A data transmission system for transmitting data including image information, sound information, or both, the data transmission system comprising:

a central control device having data memory means for storing a plurality of information data categorized in a plurality of genres;

a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres; and reproduction control means for controlling the desired information data to be transmitted from the central control device to the terminal be normally reproduced at the terminal when the desired image data is of the at least one genre the terminal is contracted for, and for preventing the desired information data from being normally reproduced at the terminal when the desired image data is out of the at least one genre the terminal is contracted for, wherein the reproduction control means controls the terminal to reproduce the desired information data in a reproduction mode different from a normal reproduction mode when the desired image data is out of the at least one genre the terminal is contracted for.

4. A data transmission system as claimed in claim 1, wherein each terminal further includes request means for transmitting to the central control device a request of transmission of the desired information data selected by the data selecting means, and wherein the central control device further includes transmission control means for transmitting the desired information data to the terminal for normal reproduction only when the desired information data is of the at least one genre the terminal is contracted for, the data storage means temporarily storing the desired information data transmitted from the transmission control means.

5. A data transmission system as claimed in claim 4, wherein the transmission control means includes:

contract memory means for storing data indicating the at least one genre for which each of the terminals is contracted; and judging means for judging whether the desired information data is of the at least one genre which the terminal is contracted for.

6. A data transmission system as claimed in claim 1, wherein each terminal further includes request control means for transmitting to the central control device a request of transmission of the desired information data selected by the data selecting means only when the desired information data is of the at least one genre the terminal is contracted for, and wherein each of the plurality of terminals further includes reception means for receiving the desired information data transmitted from the central control device, the data storage means temporarily storing the desired information data received by the reception means.

7. A data transmission system as claimed in claim 6, wherein the request control means includes:

terminal contract memory means for storing data indicating the at least one genre for which the terminal is contracted; and judging means for judging whether the desired information data is of the at least one genre which the terminal is contracted for.

8. A data transmission system for transmitting data including image information, sound information, or both, the data transmission system comprising:

a central control device having data memory means for storing a plurality of information data categorized in a plurality of genres;

a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres; and reproduction control means for controlling the desired information data to be transmitted from the central control device to the terminal and to be normally reproduced at the terminal when the desired image data is of the at least one genre the terminal is contracted for, and for preventing the desired information data from being normally reproduced at the terminal when the desired image data is out of the at least one genre the terminal is contracted for, wherein the central control device constantly transmits, to each of the terminals, the plurality of information data stored in the data memory means, and wherein each of the plurality of terminals further includes reception control means for receiving the desired information data from the central control device only when the desired image data is of the at least one genre the terminal is contracted for.

9. A data transmission system for transmitting data including image information, sound information, or both, the data transmission system comprising:

a central control device having data memory means for storing a plurality of information data categorized in a plurality of genres;

a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres; and reproduction control means for controlling the desired information data to be transmitted from the central control device to the terminal and normally reproduced at the terminal when the desired image data is of the at least one genre the terminal is contracted for, and for preventing the desired information data from being normally reproduced at the terminal when the desired image data is out of the at least one genre the terminal is contracted for, wherein the central control device constantly transmits, to each of the terminals, the plurality of information data stored in the data memory means, and wherein each of the plurality of terminals further includes reception control means for receiving the desired information data from the central control device only when the desired image data is of the at least one genre the terminal is contracted for, the reception control means includes:

terminal contract memory means for storing data indicating the at least one genre for which the terminal is contracted; and judging means for judging whether the desired information data is of the at least one genre which the terminal is contracted for.

10. A data transmission system for controlling transmission of information data via a transmission line from a central control unit to a plurality of terminals, the data transmission system comprising:

a central control unit including data memory means for storing a plurality of information data categorized in a plurality of genres; and a plurality of terminals connected to said central control unit via a transmission line, each of the terminals being contracted for at least one genre, wherein said central control unit further includes request polling signal transmission means for transmitting request polling signals to the plurality of terminals for detecting whether the terminal requests transmission of desired information data, wherein each of said plurality of terminals further includes request response signal transmission means for transmitting a request response signal indicating whether or not the terminal requests the transmission of information data when the terminal receives the request polling signal transmitted from the request polling signal transmission means, and wherein said central control unit further includes information data transmission means for transmitting the desired information data to a terminal that has transmitted the request response signal indicating that the terminal requests the transmission of the desired information data, only when the desired information data is of the genre the terminal is contracted for.

11. A data transmission system as claimed in claim 10, wherein the information data transmission means includes:

contract table memory means for storing a contract table indicating the at least one genre for which each of the terminals is contracted; and judging means for judging whether the desired information data requested by the request response signal from the terminal is of the at least one genre which the terminal is contracted for.

12. A data transmission system as claimed in claim 10, wherein the central control unit further includes mode sense polling signal transmission means for transmitting a mode sense polling signal, via the transmission line, to each of the plurality of terminals for confirming an operation mode of each terminal, wherein each of said plurality of terminals further includes mode response signal transmission means for transmitting, in response to the mode sense polling signal, a mode response signal indicating a present operation mode of the each terminal to the central control unit via the transmission line, wherein said central control unit further includes determination means for determining the operation mode of each terminal, based on the mode response signal transmitted from each terminal, the request polling signal transmission means selectively transmitting the request polling signal to a terminal that is determined by the determination means to be in a predetermined operation mode for detecting whether the terminal requests transmission of the desired information data.

13. A data transmission system for controlling transmission of information data via a transmission line from a central control unit to a plurality of terminals, the data transmission system comprising:

a central control unit including data memory means for storing a plurality of information data categorized in a plurality of genres; and a plurality of terminals connected to said central control unit via a transmission line, each of the terminals being contracted for at least one genre, wherein said central control unit further includes request polling signal transmission means for transmitting request polling signals to the plurality of terminals for detecting whether the terminal requests transmission of desired information data, wherein each of said plurality of terminals further includes:

data selecting means for selecting information data desired to be obtained at the terminal out of the plurality of information data stored in the data memory means of the central control unit; and request response signal transmission means for transmitting a request response signal indicating whether or not the terminal requests the transmission of the desired information data when the terminal receives the request polling signal transmitted from the request polling signal transmission means, the request response signal transmission means transmitting the request polling signal indicating that the terminal requests the transmission of the desired information data only when the desired information data is of the at least one genre the terminal is contracted for, and wherein said central control unit further includes information data transmission means for transmitting the desired information data to a terminal that has transmitted the request response signal indicating that the terminal requests the transmission of the desired information data.

14. A data transmission system as claimed in claim 13, wherein the request response signal transmission means includes:

contract memory means for storing a contract table indicating the at least one genre for which the corresponding terminal is contracted; and judging means for judging whether the desired information data selected by the data selecting means is of the at least one genre which the corresponding terminal is contracted for.

15. A data transmission system as claimed in claim 13, wherein the central control unit further includes mode sense polling signal transmission means for transmitting a mode sense polling signal, via the transmission line, to each of the plurality of terminals for confirming an operation mode of each terminal, wherein each of said plurality of terminals further includes mode response signal transmission means for transmitting, in response to the mode sense polling signal, a mode response signal indicating a present operation mode of the each terminal to the central control unit via the transmission line, wherein said central control unit further includes determination means for determining the operation mode of each terminal, based on the mode response signal transmitted from each terminal, the request polling signal transmission means selectively transmitting the request polling signal to a terminal that is determined by the determination means to be in a predetermined operation mode for detecting whether the terminal requests transmission of the desired information data.

16. A data transmission system for transmitting, to each of a plurality of terminals, information which the each terminal desires to receive, the data transmission system comprising:

a central control unit including data memory means for storing a plurality of information data units, each indicative of an individual information, the plurality of information data units being categorized in a plurality of genres; and a plurality of terminals connected to said central control unit via a transmission line, each of the terminals including data selecting means for selecting, out of the plurality of information data units, an information data unit indicative of information that the each terminal desires to obtain, each terminal being contracted for at least one genre, wherein said central control unit includes data transmission means for successively transmitting the plurality of data units to each of the plurality of terminals via the transmission line, and wherein each of the plurality of terminals includes reception means for receiving the desired information data unit from the plurality of data units transmitted from the central control unit only when the desired information data unit is of the at least one genre the each terminal is contracted for each of the plurality of terminals further including data storage means for temporarily storing the desired information data unit received by the reception means.

17. A data transmission system for transmitting, to each of a plurality of terminals, information which the each terminal desires to receive, the data transmission system comprising:

a central control unit including data memory means for storing a plurality of information data units, each indicative of an individual information, the plurality of information data units being categorized in a plurality of genres; and a plurality of terminals connected to said central control unit via a transmission line, each of the terminals including data selecting means for selecting, out of the plurality of information data units, an information data unit indicative of information that the each terminal desires to obtain, each terminal being contracted for at least one genre, wherein said central control unit includes data transmission means for successively transmitting the plurality of data units to each of the plurality of terminals via the transmission line, and wherein each of the plurality of terminals includes reception means for receiving the desired information data unit from the plurality of data units transmitted from the central control unit only when the desired image data is of the at least one genre the each terminal contracted for, the reception means includes:

terminal contract memory means for storing data indicating the at least one genre for which the corresponding terminal is contracted; and judging means for judging whether the desired information data selected by the data selecting means is of the at least one genre which the terminal is contracted for.

18. A data transmission system for transmitting, to each of a plurality of terminals, information which the each terminal desires to receive, the data transmission system comprising:

a central control unit including data memory means for storing a plurality of information data units, each indicative of an individual information, the plurality of information data units being categorized in a plurality of genres; and a plurality of terminals connected to the central control unit via a transmission line, each of the terminals including data selecting means for selecting, out of the plurality of information data units, an information data unit indicative of information that the each terminal desires to obtain, each terminal being contracted for at least one genre;

wherein said central control unit includes data transmission means for successively transmitting the plurality of data units to each of the plurality of terminals via the transmission line, and wherein each of the plurality of terminals includes reception means for receiving the desired information data unit from the from the plurality of data units transmitted from the central control unit only when the desired information data is of the at least one genre the each terminal is contracted for, the reception means includes:

terminal contract memory means for storing data indicating the at least one genre for which the corresponding terminal is contracted; and judging means for judging whether the desired information data selected by the data selecting means is of the at least one genre which the terminal is contracted for, wherein the transmission means includes data multiplexing transmission means for transmitting the plurality of information data units over several channels via the transmission line to each of the plurality of terminals, the data multiplexing transmission means including modulating means for modulating each of the plurality of data units into an alternating current signal of a frequency band corresponding to either one of the several channels, to thereby transmit the each data unit over the corresponding channel, and wherein the reception means of each of the plurality of terminals includes:

channel selecting means for selecting a channel over which the desired information data unit is transmitted; and data pick up means for picking up the desired information data unit from the plurality of information data units transmitted over the channel selected by the channel selecting means.

19. A data transmission system of claim 1, wherein the reproduction control means controls the terminal to reproduce the desired information data, which is transmitted from the central control device and stored in the data storage means, in a reproduction mode different from a normal reproduction mode when the desired image data is out of the at least one genre the terminal is contracted for.

20. A data transmission system as claimed in claim 1, wherein the central control device constantly transmits, to each of the terminals, the plurality of information data stored in the data memory means, and wherein each of the plurality of terminals further includes reception control means for receiving the desired information data from the central control device only when the desired image data is of the at least one genre the terminal is contracted for, the data storage means temporarily storing the desired information data received by the reception control means.

21. A data transmission system as claimed in claim 20, wherein the reception control means includes:

terminal contract memory means for storing data indicating the at least one genre for which the terminal is contracted; and judging means for judging whether the desired information data is of the at least one genre which the terminal is contracted for.

22. A data transmission system as claimed in claim 16, wherein the reception means includes:

terminal contract memory means for storing data indicating the at least one genre for which the corresponding terminal is contracted; and judging means for judging whether the desired information data selected by the data selecting means is of the at least one genre which the terminal is contracted for.

23. A data transmission system as claimed in claim 22, wherein the transmission means includes data multiplexing transmission means for transmitting the plurality of information data units over several channels via the transmission line to each of the plurality of terminals, the data multiplexing transmission means including modulating means for modulating each of the plurality of data units into an alternating current signal of a frequency band corresponding to either one of the several channels, to thereby transmit the each data unit over the corresponding channel, and wherein the reception means of each of the plurality of terminals includes:

channel selecting means for selecting a channel over which the desired information data unit is transmitted; and data pick up means for picking up the desired information data unit from the plurality of information data units transmitted over the channel selected by the channel selecting means.

24. A data transmission system for transmitting data including image information, sound information, or both, the data transmission system comprising:

a central control device having data memory means for storing a plurality of information data categorized in a plurality of genres;

a plurality of terminals connected to the central control device by a transmission line, each of the plurality of terminals including data selecting means for selecting out of the plurality of information data stored in the data memory means, at least one information data desired to be reproduced at the terminal, each of the plurality of terminals being contracted for at least one of the plurality of genres; and reproduction control means for controlling the desired information data to be transmitted from the central control device to the terminal and to be normally reproduced at the terminal when the desired image data is of the at least one genre the terminal is contracted for, and for preventing the desired information data from being normally reproduced at the terminal when the desired image data is out of the at least one genre the terminal is contracted for, wherein each terminal further includes request means for transmitting to the central control device a request of transmission of the desired information data selected by the data selecting means, and wherein the central control device further includes transmission control means for transmitting the desired information data to the terminal for normal reproduction only when the desired information data is of the at least one genre the terminal is contracted for.

* * * * *